United States Patent [19]

Houde

[11] Patent Number: 5,211,280

[45] Date of Patent: May 18, 1993

[54] ADJUSTABLE GUIDE RAIL APPARATUS FOR INDEPENDENTLY ADJUSTING POSITIONS OF FIRST AND SECOND GUIDE RAILS DISPOSED RESPECTIVELY ON OPPOSITE SIDES OF THE PATH OF A CONVEYOR

[75] Inventor: Marc-Andre Houde, Quebec, Canada

[73] Assignee: Storcan Limitee, Quebec, Canada

[21] Appl. No.: 850,529

[22] Filed: Mar. 13, 1992

[51] Int. Cl.⁵ ............................................. B65G 21/20
[52] U.S. Cl. .................................................. 198/836.3
[58] Field of Search ..................................... 198/836.3

[56] References Cited

U.S. PATENT DOCUMENTS

| | | | |
|---|---|---|---|
| 1,857,566 | 5/1932 | Perry | 198/836.3 |
| 2,229,605 | 1/1941 | Snyder et al. | 198/836.3 |
| 2,901,094 | 8/1959 | Jett | 198/836.3 |
| 3,313,400 | 4/1967 | Johnson | 198/836.3 |
| 3,527,336 | 9/1970 | Johnston | 198/836.3 |
| 3,554,353 | 1/1971 | Raudat | 198/836.3 |
| 3,800,938 | 4/1974 | Stone | 198/836.3 |
| 3,844,405 | 10/1974 | Shuford | 198/836.3 |
| 3,874,497 | 4/1975 | Carlson | 198/836.3 |
| 4,216,855 | 8/1980 | Raudat | 198/836.3 X |
| 4,502,594 | 3/1985 | Sijbrandij | 198/836.1 |
| 4,880,104 | 11/1989 | Evans et al. | 198/445 |
| 4,932,517 | 6/1990 | Johnson | 198/836.1 |
| 4,982,835 | 1/1991 | Butler et al. | 198/836.3 |

FOREIGN PATENT DOCUMENTS 1244652 7/1967 Fed. Rep. of Germany ... 198/836.3
3445426 6/1986 Fed. Rep. of Germany ... 198/836.3
0023112 3/1981 Japan .................................. 198/836.3

Primary Examiner—Robert P. Olszewski
Assistant Examiner—James R. Bidwell
Attorney, Agent, or Firm—Marks & Murase

[57] ABSTRACT

Adjustable guide rail apparatus for independently adjusting positions of guide rails disposed respectively on opposite sides of a path of a conveyor, for guiding articles. The apparatus comprises first and second elongated members to be disposed respectively in parallel and along outward surfaces of the guide rails, each member being provided with threaded sections along its length; first and second supports for supporting respectively the members in parallel to and along the outward surfaces, each support including several bodies, each body having a first channel providing a passage to and supporting the corresponding elongated member, each support having certain of their bodies provided with a second channel that is transversal and adjacent to the corresponding first channel; and rods respectively associated with certain bodies, each rod having an end that can be fixed onto the corresponding guide rail, and a threaded portion along its length. The rods are inserted into the corresponding second channel so that each rod can slide along the corresponding second channel and so that its threaded portion can be engaged with the threaded section of the corresponding elongated member, whereby a user can independently adjust the guide rails by rotating the elongated members, and lock the guide rails in desired positions with locking devices.

6 Claims, 3 Drawing Sheets

ADJUSTABLE GUIDE RAIL APPARATUS FOR INDEPENDENTLY ADJUSTING POSITIONS OF FIRST AND SECOND GUIDE RAILS DISPOSED RESPECTIVELY ON OPPOSITE SIDES OF THE PATH OF A CONVEYOR

BACKGROUND OF THE INVENTION

The present invention relates to an adjustable guide rail apparatus for adjusting positions of first and second guide rails disposed respectively on opposite sides of the path of a conveyor, for guiding articlesa along the path.

Known in the art, there is the U.S. Pat. No. 2,229,605 of H. H. SNYDER et al., granted on Jan. 21, 1941. This patent describes a conveyor unit including a conveyor and guide rails for guiding articles along the conveyor. The guide rails are disposed in laterally spaced relationship and extend longitudinally off the conveyor. The guide rails are supported by supporting units disposed in pairs at longitudinal spaced intervals. Each of the supporting units comprises a horizontal disposed crank arm, one end of the crank arm being pivotally connected to the rail, a vertically disposed shaft to the upper end of which the other end of the crank arm is keyed, a vertically disposed sleeve in which the vertical shaft is rotatably mounted. Worm gears are keyed on the lower end of the vertical shaft. A transversally disposed shaft has worm portions thereon for engaging the worm gears so that they will be rotated simultaneously. Means are also provided on each end of the transversally disposed shaft for rotating it.

One problem with this apparatus resides in the fact that it is not possible to adjust independently each guide rail.

Also known in the art, there are the following U.S. patents that describe different guide rail systems for conveyors: U.S. Pat. No. 3,554,353 (RAUDAT), granted on Jan. 12, 1971; U.S. Pat. No. 3,800,938 (STONE), granted on Apr. 2, 1974; U.S. Pat. No. 3,874,497 (CARLSON), granted on Apr. 1, 1975; U.S. Pat. No. 4,502,594 (SIJBRANDIJ), granted on Mar. 5, 1985; U.S. Pat. No. 4,880,104 (EVANS et. al.), granted on Nov. 14, 1989; U.S. Pat. No. 4,932,517 (JOHNSON), granted on Jun. 12, 1990; U.S. Pat. No. 4,982,835 (BUTLER et al.), granted on Jan. 8, 1991.

One problem with these systems is that they cannot provide a means for adjusting guide rails of relatively long sections in such a manner that the user does not have to make several cumbersome adjustments.

It is an object of the present invention to provide an adjustable guide rail apparatus by which relatively long sections of guide rails can be adjusted in a single operation by the user.

It is also an object of the present invention to provide an adjustable guide rail apparatus by which each guide rail of relatively long section can be adjusted independently.

SUMMARY OF THE INVENTION

According to the present invention, there is provided an adjustable guide rail apparatus for independently adjusting positions of first and second guide rails disposed respectively on opposite sides of a path of a conveyor, for guiding articles along said path, comprising:

first and second elongated members to be disposed respectively in parallel and along outward surfaces of said first and second guide rails, each of said members being provided with threaded sections along its length, said members being provided respectively with first and second handles at one of their extremities so that said members can be rotated by a user;

first and second support means for supporting respectively said members in parallel to and along said outward surfaces, each of said support means including several bodies, each of said bodies having a first channel providing a passage to and supporting the corresponding elongated member along its length in such a way that said member can be rotated, and fixing means for fixing each of said bodies onto said conveyor so that said members can be fixed with respect to said conveyor, each of said support means having certain of their bodies provided with a second channel that is transversal and adjacent to the corresponding first channel, said certain bodies being located at threaded sections of said members;

first and second locking means operatively associated with said first and second members respectively for preventing rotation thereof, each of said locking means being provided with a handle so that said members can be locked in desired positions by said user; and rods respectively associated with said certain bodies, each of said rods having an end that can be fixed onto the corresponding guide rail, and a threaded portion along its length, said rods being inserted into the corresponding second channel so that each of said rods can slide along the corresponding second channel and so that its threaded portion can be engaged with the threaded section of the corresponding elongated member; whereby said user can independently adjust said first and second guide rails by rotating said handles of said first and second elongated members, and lock said guide rails in desired positions by means of said handles of said first and second locking means.

The objects, advantages and other features of the present invention will become more apparent upon reading of the following non-restrictive description of a preferred embodiment thereof, given for the purpose of exemplification only with reference to the accompanying drawings.

DETAILED DESCRIPTION OF A PREFERRED EMBODIMENT

Figure 1:
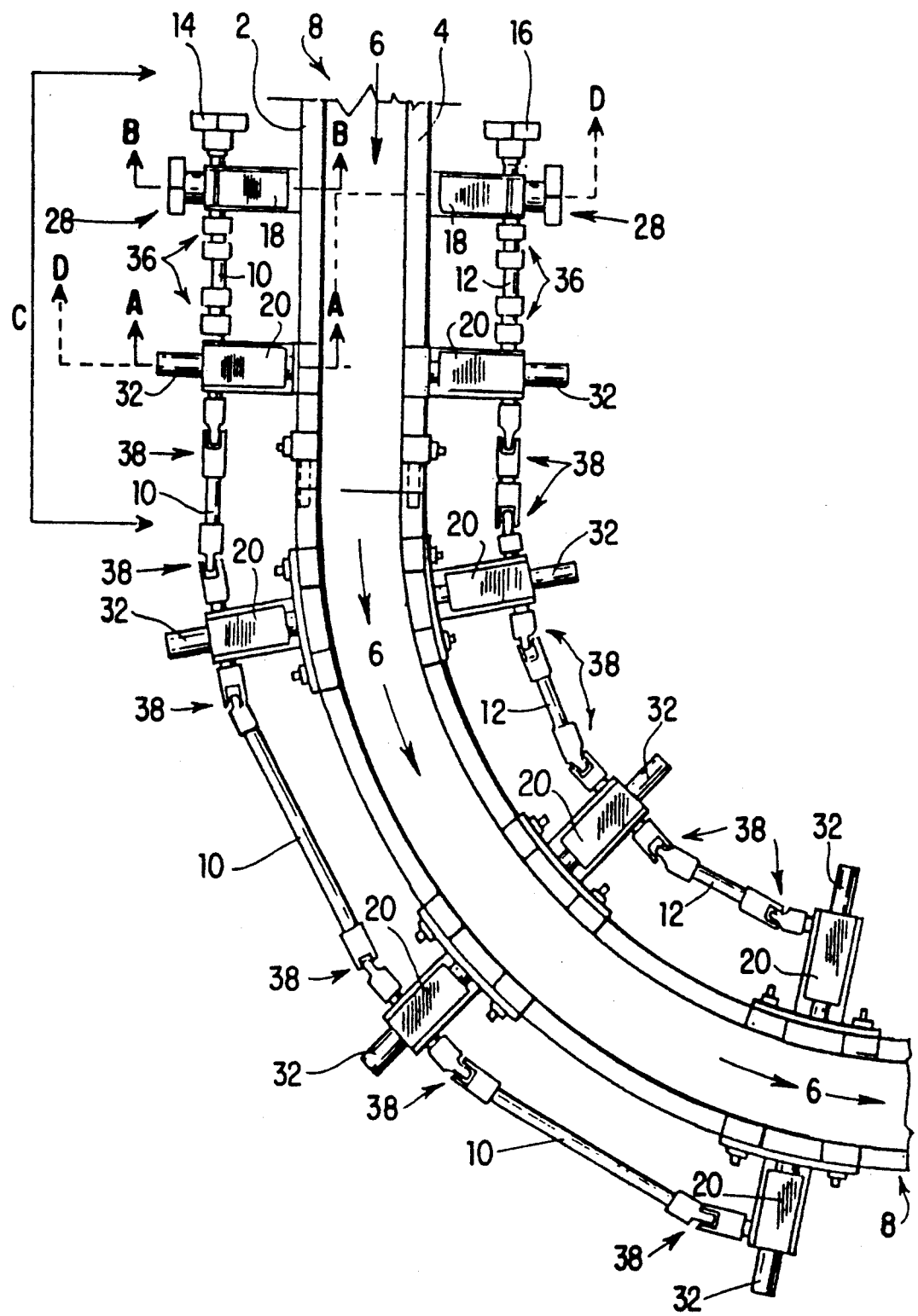
FIG. 1 is a top view of a conveyor equipped with an adjustable guide rail apparatus in compliance with the present invention.
Figure 2:
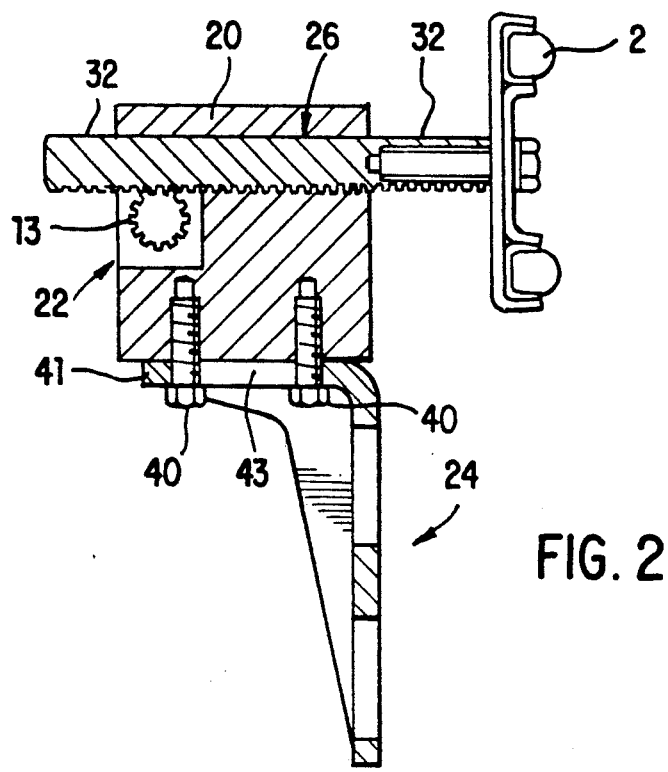
FIG. 2 is a cross-sectional view along line A—A of FIG. 1.
Figure 3:
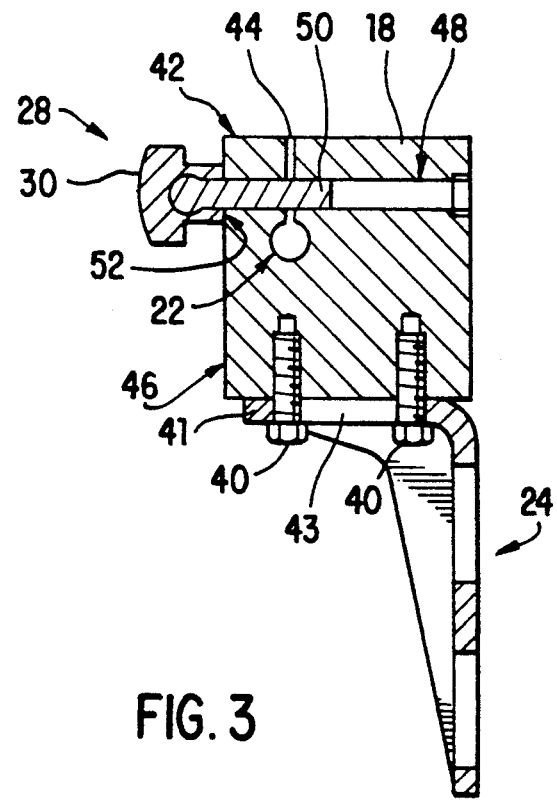
FIG. 3 is a cross-sectional view along line B—B of FIG. 1.

Referring now to FIGS. 1, 2 and 3, there is shown the adjustable guide rail apparatus for independently adjusting positions of first and second guide rails 2 and 4 disposed respectively on opposite sides of the path 6 of a conveyor 8, for guiding articles (not shown in these figures) along the path 6. The apparatus comprises first and second elongated members 10 and 12 to be disposed respectively in parallel and along outward surfaces of the first and second guide rails 2 and 4. Each of the members 10 and 12 is provided with threaded portions 13 along its length. The members 10 and 12 are provided respectively with first and second handles 14 and 16 at one of their extremities so that they can be rotated by a user.

There are also provided first and second support devices for supporting respectively the members 10 and 12 in parallel and along the outward surfaces. Each of these support devices includes several bodies 18 and 20. Each of the bodies 18 and 20 has a first channel 22 providing a passage to and supporting the corresponding elongated member 10 or 12 along its length in such a way that the member 10 or 12 can be rotated. Each of the bodies 18 and 20 is provided with a L-shaped member 24 for fixing it onto the conveyor 8 so that the members 10 and 12 can be fixed with respect to the conveyor 8. Each of the support devices has certain bodies 20 provided with a second channel 26 that is transversal and adjacent to the corresponding first channel 22. These bodies 20 are located at threaded sections 13 of the members 10 and 12.

There are also provided first and second locking devices 28 operatively associated with the first and second members 10 and 12 respectively for preventing rotation thereof. Each of the locking devices 28 is provided with a handle 30 so that the members 10 and 12 can be locked in desired positions by the user.

Rods 32 respectively associated with the bodies 20 are provided. Each of these rods 32 has an end that can be fixed onto the corresponding guide rail 2 or 4, and a threaded portion along its length. The rods 32 are inserted into the corresponding second channel 26 so that each of these rods 32 can slide along the corresponding second channel 26 and so that its threaded portion can be engaged with the threaded section of the corresponding elongated member as it can be seen in FIG. 2.

Then, the user can independently adjust the first and second guide rails 2 and 4 by rotating the handles 14 and 16 of the first and second elongated members 10 and 12, and lock the guide rails 2 and 4 in desired positions by means of the handles 30 of the first and second locking devices 28.

Each of the elongated members 10 and 12 comprises mechanical joints 36 and 38 connecting together each of the threaded portions 13. These mechanical joints 36 and 38 comprises pivotal mechanical joints 38 so that each of the elongated members 10 and 12 can follow a curve along the path 6 as shown in FIG. 1.

The bodies 18 and 20 of the support devices are right parallelepiped. Each of the L-shaped members 24 has an upper horizontal section 41 that can be fixed onto the corresponding body 18 or 20 by means of screws 40, and a lateral vertical section that can be fixed onto lateral portions of the conveyor 8 by means of screws. Each of the L-shaped members 24 has its horizontal section provided with a slot 43 adapted to receive the screws 40 so that each body 20 can be adjusted with respect to the conveyor 8 in a horizontal manner.

Each of the support devices has a predetermined one of its bodies 18 and 20 that is a right parallelepiped having a first side 42 provided with a longitudinal slot 44 that follows and reaches the corresponding first channel 22, and a second side 46 provided with a cylindrical cavity 48 transversal to the corresponding slot 44. The cavity 48 has a portion that goes beyond the slot 44 and that is provided with threads. Each of the locking devices 28 comprises a rod 50 having an end connected to its handle 30 and an opposite end provided with threads capable of cooperating with the threads of the corresponding cavity 48. Each handle 30 of the locking devices 28 comprises a stop 52 that can rest against the second side 46 of the parallelepiped when its rod 50 is screwed into the cavity 48. Then, the user can lock each of the elongated members 10 and 12 in the desired positions, by screwing the locking devices 28 into the cavities 48 to squeeze and lock the elongated members 10 and 12 in their corresponding channels 22.

The handles 14 and 16 of the elongated members 10 and 12 are adjacent. The locking devices 28 are adjacent to the handles 14 and 16 so that the user can efficiently adjust the guide rails 2 and 4 and lock the apparatus in desired positions, at one location.

Figure 4:
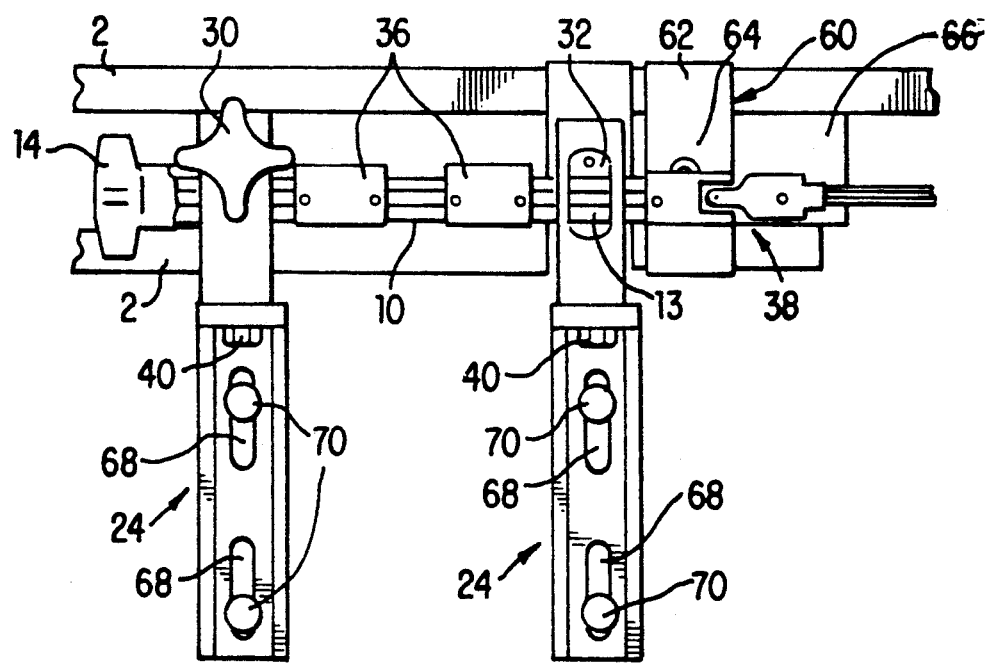
FIG. 4 is a side view along line C—C of FIG. 1.

Referring now to FIG. 4, there is shown a side view along line C—C of FIG. 1. In this side view, there is shown a connecting assembly 60 for connecting a straight section of the conveyor 8 to a curved section. This connecting assembly 60 comprises a plate 62 that is connected onto the straight section of the conveyor by means of a screw 64. This connecting assembly 60 also comprises a transversal plate 66 that is solid with the plate 62, and that has an extremity adapted to fit with the curved section of the conveyor.

In this side view, it can be seen that the L-shaped members 24 are provided with vertical slots 68 adapted to receive screws 70 that connect the members 24 onto the conveyor. The slots 68 provide a means for adjusting the L-shaped members 24 with respect to the conveyor in a vertical manner.

Figure 5:
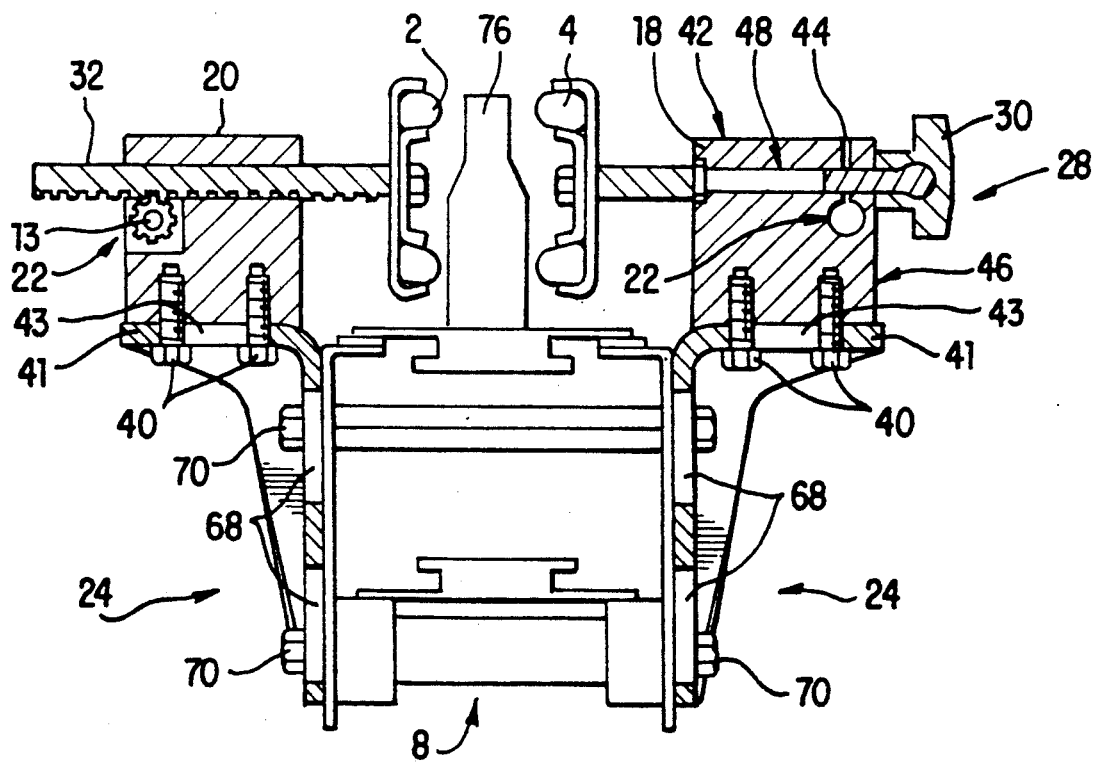
FIG. 5 is a cross-sectional view along line D—D of FIG. 1.

Referring now to FIG. 5, there is shown a cross-sectional view along line D—D of FIG. 1. In this FIG. 5, it can be seen how the article 76 is positioned with respect to the guide rails 2 and 4. It can also be seen how the bodies 18 and 20 are fixed with respect to the conveyor 8.

Although the present invention has been explained hereinabove by way of a preferred embodiment thereof, it should be pointed out that any modifications to this preferred embodiment within the scope of the appended claims is not deemed to alter or change the nature and scope of the present invention.

I claim:

1. Adjustable guide rail apparatus for independently adjusting positions of first and second guide rails disposed respectively on opposite sides of a path of a conveyor, for guiding articles along said path, comprising:

first and second elongated members to be disposed respectively in parallel and along outward surfaces of said first and second guide rails, each of said members being provided with threaded sections along its length, said members being provided respectively with first and second handles at one of their extremities so that said members can be rotated by a user;

first and second support means for supporting respectively said members in parallel to and along said outward surfaces, each of said support means including several bodies, each of said bodies having a first channel providing a passage to and supporting the corresponding elongated member along its length in such a way that said member can be rotated, and fixing means for fixing each of said bodies onto said conveyor so that said members can be fixed with respect to said conveyor, each of said support means having certain of their bodies provided with a second channel that is transversal and adjacent to the corresponding first channel, said certain bodies being located at threaded sections of said members;

first and second locking means operatively associated with said first and second members respectively for preventing rotation thereof, each of said locking means being provided with a handle so that said members can be locked in desired positions by said user; and rods respectively associated with said certain bodies, each of said rods having an end that can be fixed onto the corresponding guide rail, and a threaded portion along its length, said rods being inserted into the corresponding second channel so that each of said rods can slide along the corresponding second channel and so that its threaded portion can be engaged with the threaded section of the corresponding elongated member;

whereby said user can independently adjust said first and second guide rails by rotating said handles of said first and second elongated members, and lock said guide rails in desired positions by means of said handles of said first and second locking means.

2. Adjustable guide rail apparatus according to claim 1, wherein each of said elongated members comprises mechanical joints connecting together each of its threaded sections.

3. Adjustable guide rail apparatus according to claim 2, wherein said mechanical joints comprises pivotal mechanical joints so that said elongated members can follow a curve along said path.

4. Adjustable guide rail apparatus according to claim 1, wherein said bodies of said support means are right parallelepiped, and wherein each of said fixing means is a L-shaped member having an upper horizontal section that can be fixed onto the corresponding body by means of screws, and a lateral vertical section that can be fixed onto lateral portions of said conveyor by means of screws.

5. Adjustable guide rail apparatus according to claim 1, wherein:

each of said support means has a predetermined one of its bodies that is a right parallelepiped having a first side provided with a longitudinal slot that follows and reaches the corresponding first channel, and a second side provided with a cylindrical cavity transverse to the corresponding slot, said cavity having a portion that goes beyond said slot and that is provided with threads; and each of said locking means comprises a rod having an end connected to its handle and an opposite end provided with threads capable of cooperating with the threads of the corresponding cavity of said predetermined bodies, each handle of said locking means comprises a stop that can rest against said second side of the corresponding parallelepiped when its rod is screwed into the corresponding cavity; whereby said user can lock each of said elongated members in said desired positions, by screwing said locking means into said cavities to squeeze and lock said elongated members in their corresponding channels.

6. Adjustable guide rail apparatus according to claim 5, wherein said handles of said elongated members are adjacent, and wherein said locking means are adjacent to said handles of said elongated members so that said user can efficiently adjust said guide rails and lock said apparatus in desired positions, at one location.

* * * * *